US008203644B2

(12) United States Patent
Shabtay et al.

(10) Patent No.: US 8,203,644 B2
(45) Date of Patent: Jun. 19, 2012

(54) IMAGING SYSTEM WITH IMPROVED IMAGE QUALITY AND ASSOCIATED METHODS

(75) Inventors: Gal Shabtay, Tel-Aviv (IL); Ephraim Goldenberg, Tel-Aviv (IL)

(73) Assignee: Digitaloptics Corporation Europe Limited, Galway (IE)

( * ) Notice: Subject to any disclaimer, the term of this patent is extended or adjusted under 35 U.S.C. 154(b) by 1035 days.

(21) Appl. No.: 12/213,472

(22) Filed: Jun. 19, 2008

(65) Prior Publication Data
US 2009/0115885 A1    May 7, 2009

Related U.S. Application Data

(63) Continuation of application No. PCT/IB2007/004278, filed on Sep. 14, 2007.

(51) Int. Cl.
G03B 13/00 (2006.01)
H04N 5/232 (2006.01)
(52) U.S. Cl. ... 348/347; 348/335; 348/360; 348/240.99; 359/691; 359/692; 359/676
(58) Field of Classification Search ............... None
See application file for complete search history.

(56) References Cited

U.S. PATENT DOCUMENTS

| 6,873,358 | B1 | 3/2005 | Shimizu | |
|---|---|---|---|---|
| 2003/0016452 | A1* | 1/2003 | Sayag | 359/664 |
| 2004/0017491 | A1 | 1/2004 | Stavely | |
| 2004/0103111 | A1* | 5/2004 | Miller et al. | 707/102 |
| 2004/0263994 | A1* | 12/2004 | Sayag | 359/664 |
| 2006/0028564 | A1* | 2/2006 | Baer | 348/294 |

FOREIGN PATENT DOCUMENTS

JP    2005-311875 A    11/2005

OTHER PUBLICATIONS

European Search Report in EP 07874537.9—2202/2108231 PCT/IB2007004278, dated Jul. 29, 2011 (Shabty, et al.).

* cited by examiner

*Primary Examiner* — Jefferey Harold
*Assistant Examiner* — Omer Khalid
(74) *Attorney, Agent, or Firm* — Lee & Morse, P.C.

(57) ABSTRACT

An image capturing device may include a detector including a plurality of sensing pixels, and an optical system adapted to project a distorted image of an object within a field of view onto the sensing pixels, wherein the optical system expands the image in a center of the field of view and compresses the image in a periphery of the field of view, wherein a first number of sensing pixels required to realize a maximal zoom magnification $\hat{Z}$ at a minimum resolution of the image capturing device is less than a square of the maximal zoom magnification times a second number of sensing pixels required for the minimum resolution.

20 Claims, 5 Drawing Sheets

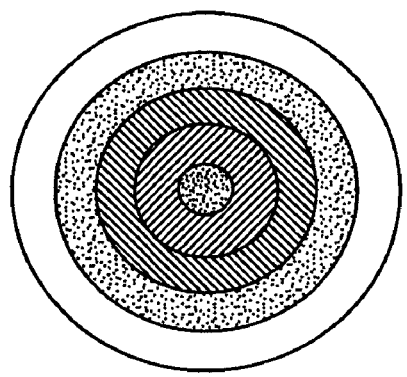
FIG. 3A
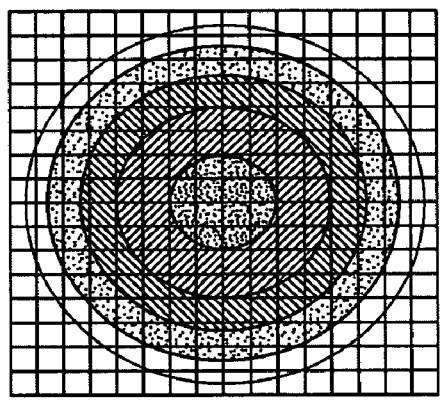 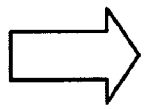 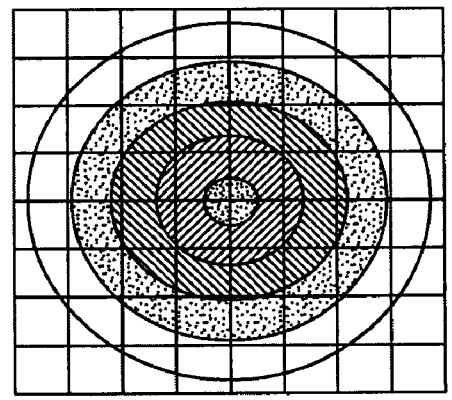
FIG. 3B  FIG. 3C
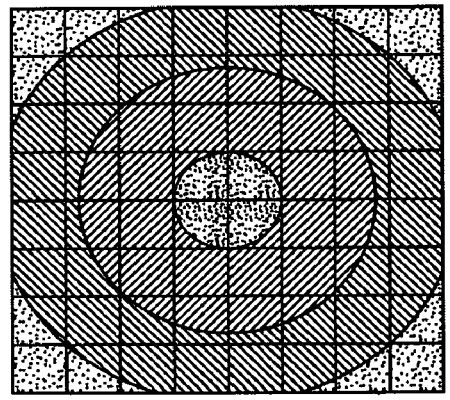
FIG. 3D

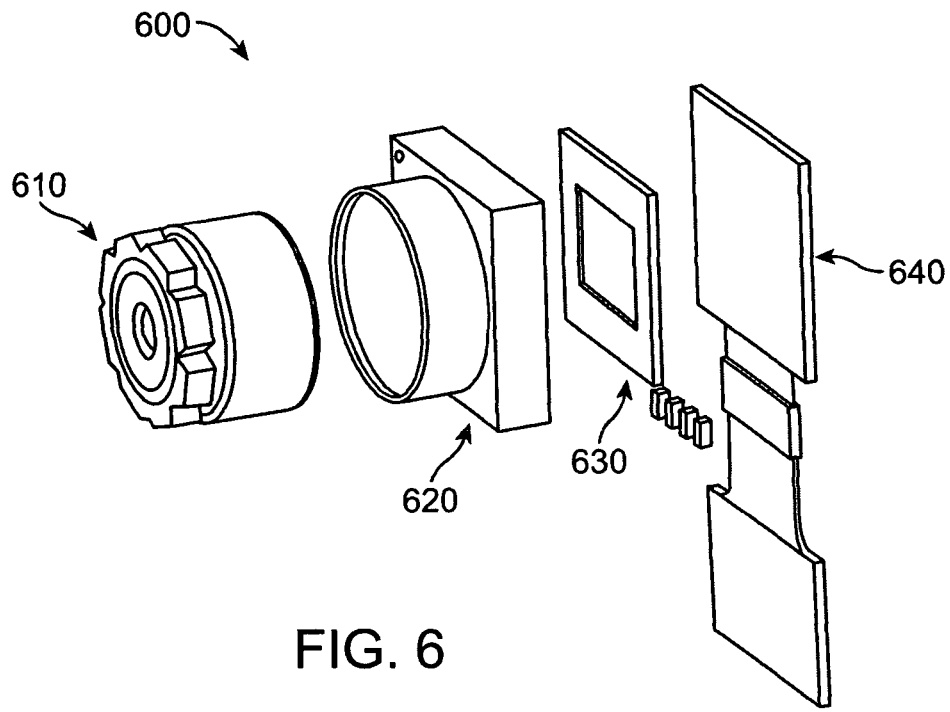
FIG. 6
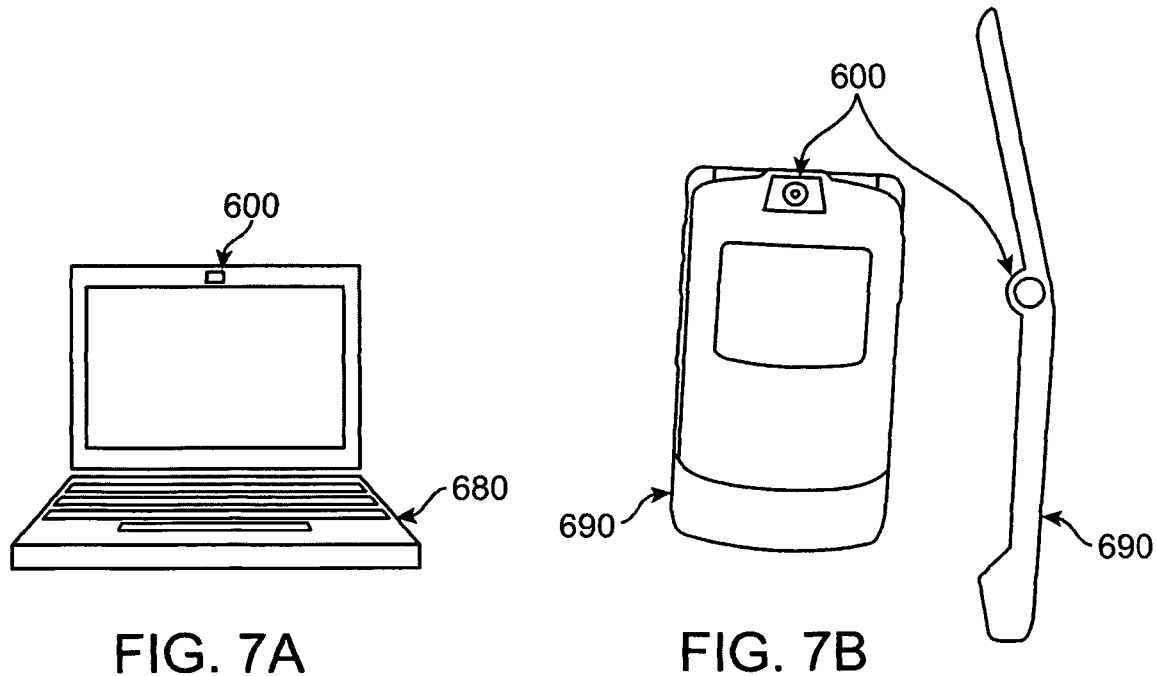
FIG. 7A
FIG. 7B

IMAGING SYSTEM WITH IMPROVED IMAGE QUALITY AND ASSOCIATED METHODS

This application is a continuation, of application Serial No PCT/IB2007/004278, filed Sep. 14, 2007, which is hereby incorporated by reference in its entirety.

BACKGROUND OF THE INVENTION

1. Field of the Invention

Embodiments are directed to an imaging system, more particularly to an imaging system having improved image quality and associated methods.

2. Description of Related Art

Recently, image capturing devices have become widely used in portable and non-portable devices such as cameras, mobile phones, webcams and notebooks. These image capturing devices conventionally include an electronic image detector such as a CCD or CMOS sensor, a lens system for projecting an object in a field of view (FOV) onto the detector and electronic circuitry for receiving, processing, and storing electronic data provided by the detector. Resolution and optical zoom are two important performance parameters of such image capturing devices.

Resolution of an image capturing device is the minimum distance two point sources in an object plane can have such that the image capturing device is able to distinguish these point sources. Resolution depends on the fact that, due to diffraction and aberrations, each optical system projects a point source not as a point but a disc of predetermined width and having a certain light intensity distribution. The response of an optical system to a point light source is known as point spread function (PSF). The overall resolution of an image capturing device mainly depends on the smaller one of the optical resolution of the optical projection system and the resolution of the detector.

Herein, the optical resolution of an optical projection system shall be defined as the full width at half maximum (FWHM) of its PSF. In other words, the peak values of the light intensity distribution of a projection of two point light sources must be spaced at least by the FWHM of the PSF in order for the image capturing device to be able to distinguish the two point light sources. However, the resolution could also be defined as a different value depending on the PSF, e.g. 70% of the width at half maximum. This definition of the optical resolution might depend on the sensitivity of the detector and the evaluation of the signals received from the detector.

The resolution of the detector is defined herein as the pitch, i.e., distance middle to middle of two adjacent sensor pixels of the detector.

Optical zoom signifies the capability of the image capturing device to capture a part of the FOV of an original image with better resolution compared with a non-zoomed image. Herein, it is assumed that in conventional image capturing devices the overall resolution is usually limited by the resolution of the detector, i.e. that the FWHM of the PSF can be smaller than the distance between two neighboring sensor pixels.

Accordingly, the resolution of the image capturing device may be increased by selecting a partial field of view and increasing the magnification of the optical projection system for this partial field of view. For example, ×2 optical zoom refers to a situation where all sensor pixels of the image detector capture half of the image, in each dimension, compared with that of ×1 zoom.

Digital still cameras (DSCs) typically employ several groups of lens elements that are mechanically shifted relative to one another in order to create a varying focal length for the whole optical system. In most common multi-use devices having cameras incorporated therein, e.g., mobile phones, notebook computer, web cameras, etc., the optical system is a fixed-focus system, i.e. there are no moving parts. Thus, it is not possible to dynamically change the system's focal length. The most widespread zoom solution offered in camera phones is "a digital zoom," a solution based on cropping the image down to a smaller size and interpolating the cropped image to the original size, where the missing information is completed in various ways. This solution only emulates the effect of a longer focal length and, by definition, adds no new information to the image.

Thus, use of digital zoom often results in an obvious loss of detail in the zoomed-in image compared to an optical zoom system. As used herein, "digital zoom" refers to signal interpolation where no additional information is actually provided, whereas "optical zoom" refers to magnification of the projected partial image, providing more information and better resolution.

In high-end devices, a mechanical zoom mechanism, similar to the zoom mechanisms in DSCs, may be employed. These systems may incorporate a small motor, typically based on piezoelectric plates, which enable movement of a lens in the Z direction (along the optical axis) and thus create a varying focal length. Such a motor may be around 3 mm in diameter and more than 15 mm in length. Further, predicted cost for mass production is very high compared with fixed-focus lens modules. Additionally, although a mechanical zoom solution provides good quality images, the presence of moving parts results in a much greater vulnerability to physical damage and erosion.

Another technology for achieving optical zoom is a liquid zoom lens. Here, the focal length of a lens changes when a pressure or electro-static force is applied on the liquid inside the lens. However, liquid zoom lens technology suffers from several known problems. For example, changing the lens's focal length in order to achieve zoom also affects the focus, i.e., a system of at least two liquid lenses (one for zoom and one for focus correction) is required. It is therefore hard to implement control mechanisms that enables continuous zoom. Liquid lenses are also known to suffer from pincushion distortion as well as chromatic aberrations. Further, the whole system is characterized by low durability and deteriorating performance over time due to mechanical fatigue.

SUMMARY OF THE PRESENT INVENTION

Embodiments are therefore directed to a digital camera and associated methods that substantially overcome one or more of the problems due to the limitations and disadvantages of the related art.

It is a feature of an embodiment to provide an imaging system having an optical zoom using a fixed-focus lens, i.e., without any mechanical movement mechanism.

It is another feature of an embodiment of the present invention to provide an imaging system having variable resolution across the image sensor, e.g., having reduced resolution at the image borders or a larger pixel-sensor area.

It is yet another feature of an embodiment to provide a imaging system realizing optical zoom by having distortion that is later on corrected digitally.

At least one of the above and other features and advantages of the present invention may be realized by providing an image capturing device, comprising a detector including a plurality of sensing pixels, and an optical system adapted to project a distorted image of an object within a field of view onto the sensing pixels, wherein the optical system expands the image in a center of the field of view and compresses the image in a periphery of the field of view, wherein a first number of sensing pixels required to realize a maximal zoom magnification $\hat{Z}$ at a minimum resolution of the image capturing device is less than a square of the maximal zoom magnification times a second number of sensing pixels required for the minimum resolution.

The first number of sensing pixels may be less than or equal to the second number of sensing pixels times $2\ln(\hat{Z})+1$, where $\hat{Z}$ is the maximal zoom magnification. The first number of sensing pixels may be equal to about 1.75 times the second number of sensing pixels.

The optical system may be adapted such that a point spread function in the periphery of the field of view has a full width at half maximum substantially the size of a sensing pixel. The optical system may be adapted such that an optical magnification at the center of the field of view is more than twice an optical magnification at the periphery of the field of view.

The optical system may be adapted to provide the distorted image that is separable in orthogonal directions. The optical system may be adapted to provide the distorted image that is radially symmetric. The image capturing device may further include a processor adapted to manipulate electronic information output from the detector. The first number of sensing pixels may have an equal pitch across the detector.

The optical system includes a plurality of lenses. All of the plurality of lenses may be plastic. Each of the plurality of lenses may be fixed focus lenses, i.e., there may be no moving lenses.

At least one of the above and other features may be realized by providing a method of providing zoom to a fixed focus lens system, the method including receiving an expanded image in a center of a field of view, receiving a compressed the image in a periphery of the field of view, and processing a first number of sensing pixels required to realize a maximal zoom magnification at a minimum resolution, wherein the first number of sensing pixels is less than a square of the maximal zoom magnification times a second number of sensing pixels required for the minimum resolution.

The first number of sensing pixels may be less than or equal to the second number of sensing pixels times $2\ln(\hat{Z})+1$, where $\hat{Z}$ is the maximal zoom magnification. The first number of sensing pixels may be equal to about 1.75 times the second number of sensing pixels.

At least one of the above and other features may be realized by providing a method of creating an image capturing device, the method including forming an optical system adapted to project a distorted image of an object within a field, wherein the optical system expands the image in a center of the field of view and compresses the image in a periphery of the field of view, providing a detector proximate to the optical system, the detector having a first resolution higher than a second resolution of an image to be output, and processing signals output from the detector to provide the image of the first resolution over a continuous zoom range.

The continuous zoom range may be from ×1 to ×3. The first resolution corresponds to a first number of sensing pixels, the second resolution corresponds to a second number of sensing pixels, $\hat{Z}$ is a maximal zoom magnification and the first number of sensing pixels in the detector is less than $\hat{Z}^2$ times the second number of sensing pixels.

BRIEF DESCRIPTION OF THE DRAWINGS

The above and other features and advantages will become readily apparent to those of skill in the art by describing in detail example embodiments with reference to the attached drawings, in which:

FIGS. 3A to 3D illustrate an object and corresponding displayed images for different zoom levels in accordance with an embodiment;

FIG. 6 illustrates an exploded view of a digital camera in accordance with an embodiment;

FIG. 7A illustrates a perspective view of a portable computer with a digital camera integrated therein in accordance with an embodiment; and FIG. 7B illustrates a front and side view of a mobile telephone with a digital camera integrated therein in accordance with an embodiment.

DETAILED DESCRIPTION OF THE INVENTION

Figure 1A:
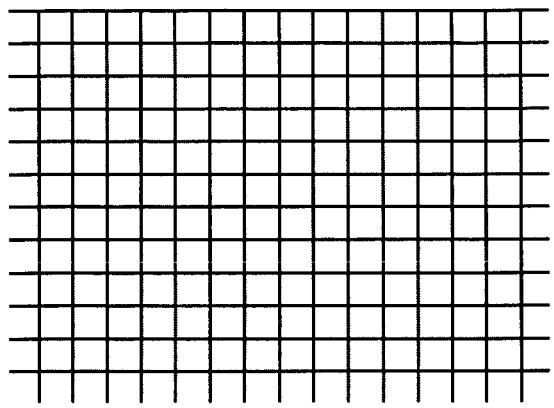
FIGS. 1A and 1B illustrate a rectangular pattern and a distorted rectangular pattern having distortion that is separable in X & Y coordinates, respectively.

U.S. Provisional Application No. 60/825,726, filed on Sep. 15, 2006, and entitled: "DIGITAL CAMERA WITH IMPROVED IMAGE QUALITY" is hereby incorporated by reference in it entirety.

Embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the embodiments to those skilled in the art. In the figures, the dimensions of layers and regions are exaggerated for clarity of illustration. Like reference numerals refer to like elements throughout.

In accordance with embodiments, an optical zoom may be realized using a fixed-focus lens combined with post processing for distortion correction. A number of pixels used in the detector may be increased beyond a nominal resolution desired to support zoom capability. First, an initial introduction to the concept of using distortion to realize zoom will be briefly discussed.

Commonly assigned, co-pending PCT Application Serial No. EP2006-002864, which is hereby incorporated by reference, discloses an image capturing device including an electronic image detector having a detecting surface, an optical projection system for projecting an object within a field of view (FOV) onto the detecting surface, and a computing unit for manipulating electronic information obtained from the image detector. The projection system projects and distorts the object such that, when compared with a standard lens system, the projected image is expanded in a center region of the FOV and is compressed in a border region of the FOV.

As disclosed therein, the projection system may be adapted such that its point spread function (PSF) in the border region of the FOV has a FWHM corresponding essentially to the size of corresponding pixels of the image detector. In other words, this projection system may exploit the fact that resolution in the center of the (FOV) is better than at wide incident angles, i.e., the periphery of the FOV. This is due to the fact that the lens's point spread function (PSF) is broader in the FOV borders compared to the FOV center.

The resolution difference between the on-axis and peripheral FOV may be between about 30% and 50%. This effectively limits the observable resolution in the image borders, as compared to the image center.

Thus, the projection system may include fixed-focus optics having a larger magnification factor in the center of the FOV compared to the borders of the FOV. In other words, an effective focal length (EFL) of the lens is a function of incident angle such that the EFL is longer in the image center and shorter in the image borders. Such a projection system projects a distorted image, in which the central part is expanded and the borders are compressed. Since the magnification factor in the image borders is smaller, the PSF in the image borders will become smaller too, spreading on fewer pixels on the sensor, e.g., one pixel instead of a square of four pixels. Thus, there is no over-sampling these regions, and there may be no loss of information when the PSF is smaller than the size of a pixel. In the center of the FOV, however, the magnification factor is large, which may result in better resolution. Two discernable points that would become non-discernable on the sensor due to having a PSF larger than the pixel size may be magnified to become discernable on the sensor, since each point may be captured by a different pixel.

The computing unit may be adapted to crop and compute a zoomed, undistorted partial image from the center region of the projected image, taking advantage of the fact that the projected image acquired by the detector has a higher resolution at its center than at its border region. For normal pictures of the entire field of view, the center region is compressed computationally. However, if a zoomed partial image of a part of the image close to the center is to be taken, this can be done by simply cropping the partial image and compressing it less or not compressing it at all, depending on the desired zoom and the degree of distortion of the partial image. In other words, with respect to a non-zoomed image, the image is expanded and cropped so that a greater number of pixels may be used to describe the zoomed image.

Thus, this zoom matches the definition of optical zoom noted above. However, this optical zoom may be practically limited to about ×2 or ×3.

In order to realize larger zoom magnifications, embodiments are directed to exploiting the tradeoff between the number of pixels used and the zoom magnification. In other words, larger zoom magnifications may require increasing the number of pixels in the sensor to avoid information loss at the borders. A number of pixels required to support continuous zoom may be determined from discrete magnifications, where $Z_1$ is the largest magnification factor and $Z_P$ is the smallest magnification factor. The number of pixels required to support these discrete zoom modes, considering N pixels to cover the whole FOV may be given by Equation 1:

$$\tilde{N} = N + N\left(1 - \left(\frac{Z_2}{Z_1}\right)^2\right) + N\left(1 - \left(\frac{Z_3}{Z_2}\right)^2\right) + \ldots + N\left(1 - \left(\frac{Z_P}{Z_{P-1}}\right)^2\right) \quad (1)$$

Rearranging Equation 1, Equation 2 may be obtained as follows:

$$\frac{\tilde{N}}{N} = P - \sum_{i=1}^{P-1} \left(\frac{Z_{i+1}}{Z_i}\right)^2 \quad (2)$$

Substituting $Z_i$–$dZ$ for $Z_{i+1}$ in order to obtain a continuous function of Z results in Equation 3:

$$\frac{\tilde{N}}{N} = P - \sum_{i=1}^{P-1} 1 - \frac{2dZ}{Z_i} + \left(\frac{dZ}{Z_i}\right)^2 \quad (3)$$

Discarding higher power terms, e.g., above the first term, and replacing summation with integration, Equation (4) may be obtained:

$$\frac{\tilde{N}}{N} = P - \left((P-1) - 2\int_{i=1}^{\hat{Z}} \frac{2dZ}{Z_i}\right) = 2\ln(\hat{Z}) + 1 \quad (4)$$

where $\hat{Z}$ is the maximal zoom magnification desired.

In other words, for a standard digital camera, i.e., distortion free, with a rectangular sensor of K Mega Pixels ([MP]) producing an image of L [MP] (L<K), the maximum applicable optical zoom (for L[MP] image) for the entire image may be limited to $$\sqrt{\frac{K}{L}}.$$

In other words, for a desired optical zoom, Z, K equals $Z^2$ times L.

Thus, when the zoom required is ×2, a standard camera requires four times more pixels. However, in accordance with embodiments, higher zoom may be realized at the center of the image due to the distorting mechanism the optics introduces. Thus, as can be seen from Equation 4 above, only approximately 2.38 times as many pixels may be needed for an ×2 zoom. For example, using a standard 2 MP image sensor, applying 2× zoom will require 4.77 MP for a completely lossless zoom. Relaxing demands on the quality in image borders, i.e., allowing loss of information, will decrease this number, e.g., down to about 1.75 times as many pixels for ×2 zoom.

Figure 1B:
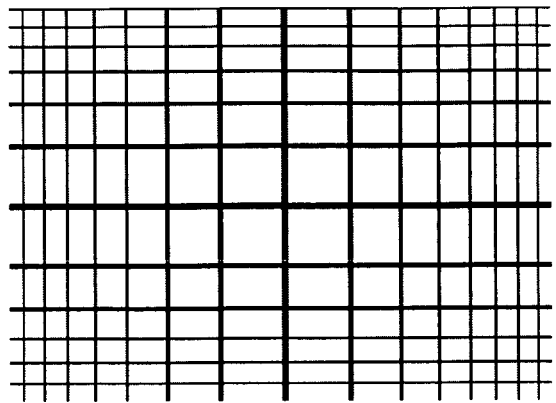
Figure 2A:
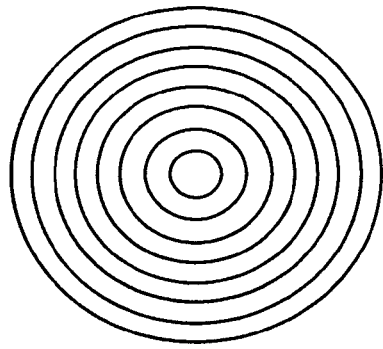
FIGS. 2A and 2B illustrate an example of a circularly symmetric pattern and a distorted circularly symmetric pattern, respectively.
Figure 2B:
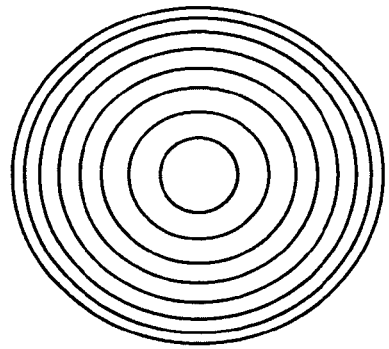

FIGS. 1A and 1B illustrate an original rectangular pattern and a projected rectangular pattern as distorted in accordance with an embodiment, respectively. In this specific example, the transformation representing the distortion is separable in the horizontal and vertical axes. FIGS. 2A and 2B illustrate an original circularly symmetric pattern and a projected circularly symmetric pattern as distorted in accordance with an embodiment, respectively. As can be seen therein, the patterns are expanded in a central region and compressed in a border region. Other types of distortion, e.g., anamorphic distortion, may also be used.

FIGS. 3A to 3D illustrate a general process of imaging an object, shown in FIG. 3A, in accordance with embodiments. The object is first projected and distorted by a lens system in accordance with an embodiment and captured by a high resolution, i.e., K[MP] detector, in FIG. 3B. A corrected lower resolution, i.e., L[MP] image with a ×1 zoom is illustrated in FIG. 3C. A corrected ×2 zoom image, having the same L[MP] resolution as the ×1 image, is shown in FIG. 3D.

Figure 4A:
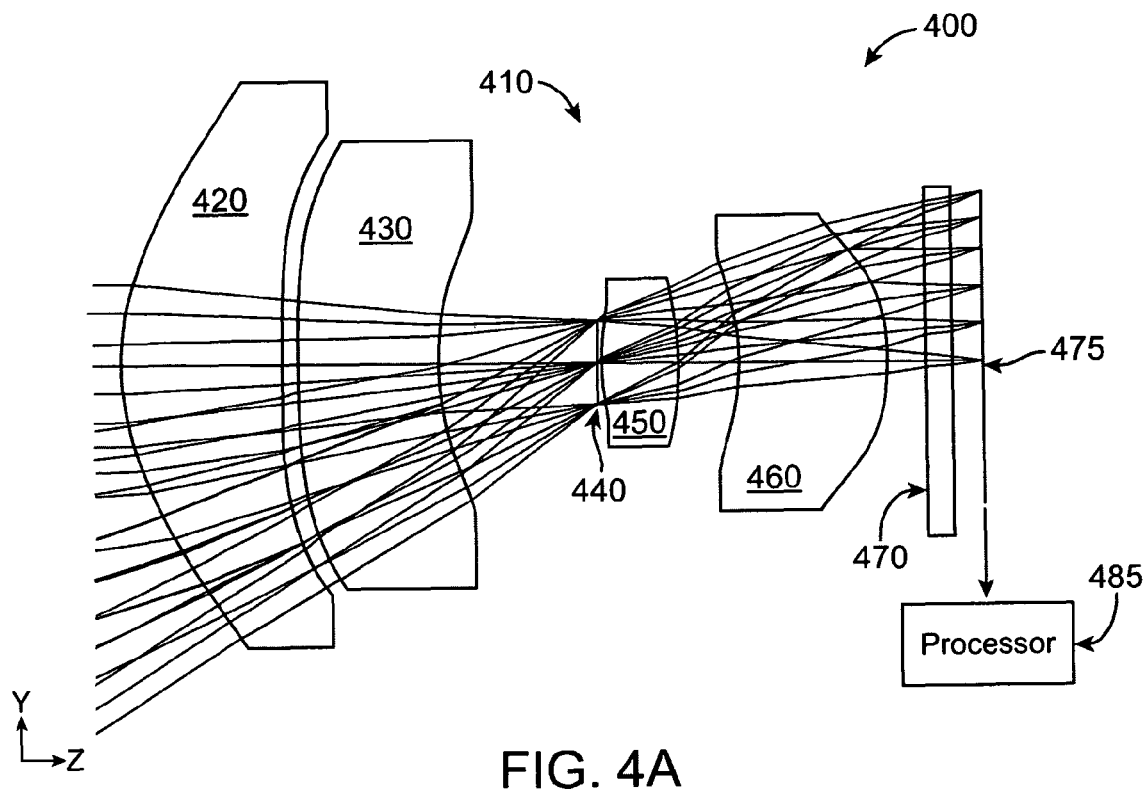
FIG. 4A illustrates an example of an optical design in accordance with an embodiment.

FIG. 4A illustrates an example imaging capturing device 400 including an optical system 410 for imaging an object (not shown) onto a detector 475, i.e., an image plane, that outputs electrical signals in response to the light projected thereon. These electrical signals may be supplied to a processor 485, which may process, store, and/or display the image. The optical system 410 may include a first lens 420 having second and third surfaces, a second lens 430 having fourth and fifth surfaces, an aperture stop 440 at a sixth surface, a third lens 450 having seventh and eight surfaces, a fourth lens 460 having ninth and tenth surfaces, an infrared (IR) filter 470 having eleventh and twelfth surfaces, all of which image the object onto the image plane 475.

In this particular example, the optical system 410 may have a focal length of 6 mm and an F-number of 3.4. The optical system 410 according to an embodiment may provide radial distortion having image expansion in the center and image compression at the borders for a standard FOV of ±30°.

Figure 4B:
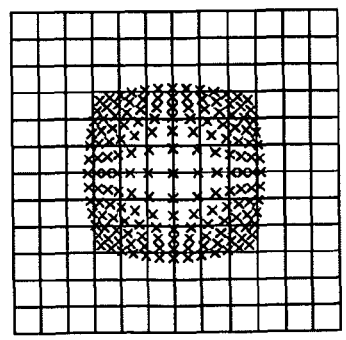
FIG. 4B illustrates grid distortions produced using the optical design of FIG. 4A.
Figure 4C:
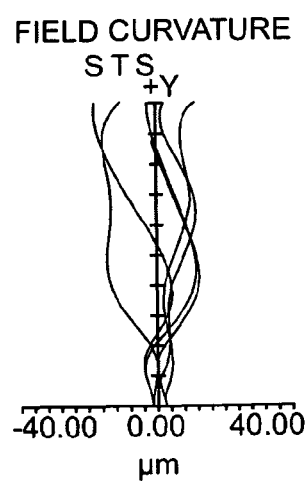
FIG. 4C illustrates field curvature of the optical design of FIG. 4A.
Figure 4D:
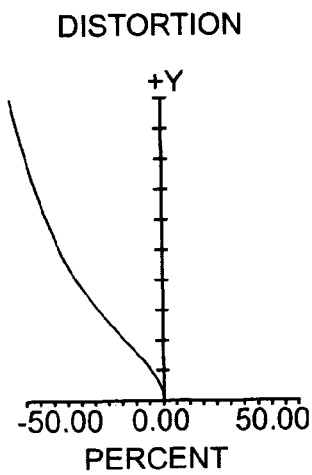
FIG. 4D illustrates distortion of the optical design of FIG. 4A.

The optical design coefficients and the apertures of all optical surfaces along with the materials from which the lenses may be made are provided as follows:

FIG. 4B illustrates a grid distortion provided by the optical system 410. FIG. 4C illustrates field curvature of the optical system 410. FIG. 4D illustrates distortion of the optical system 410.

Figure 5:
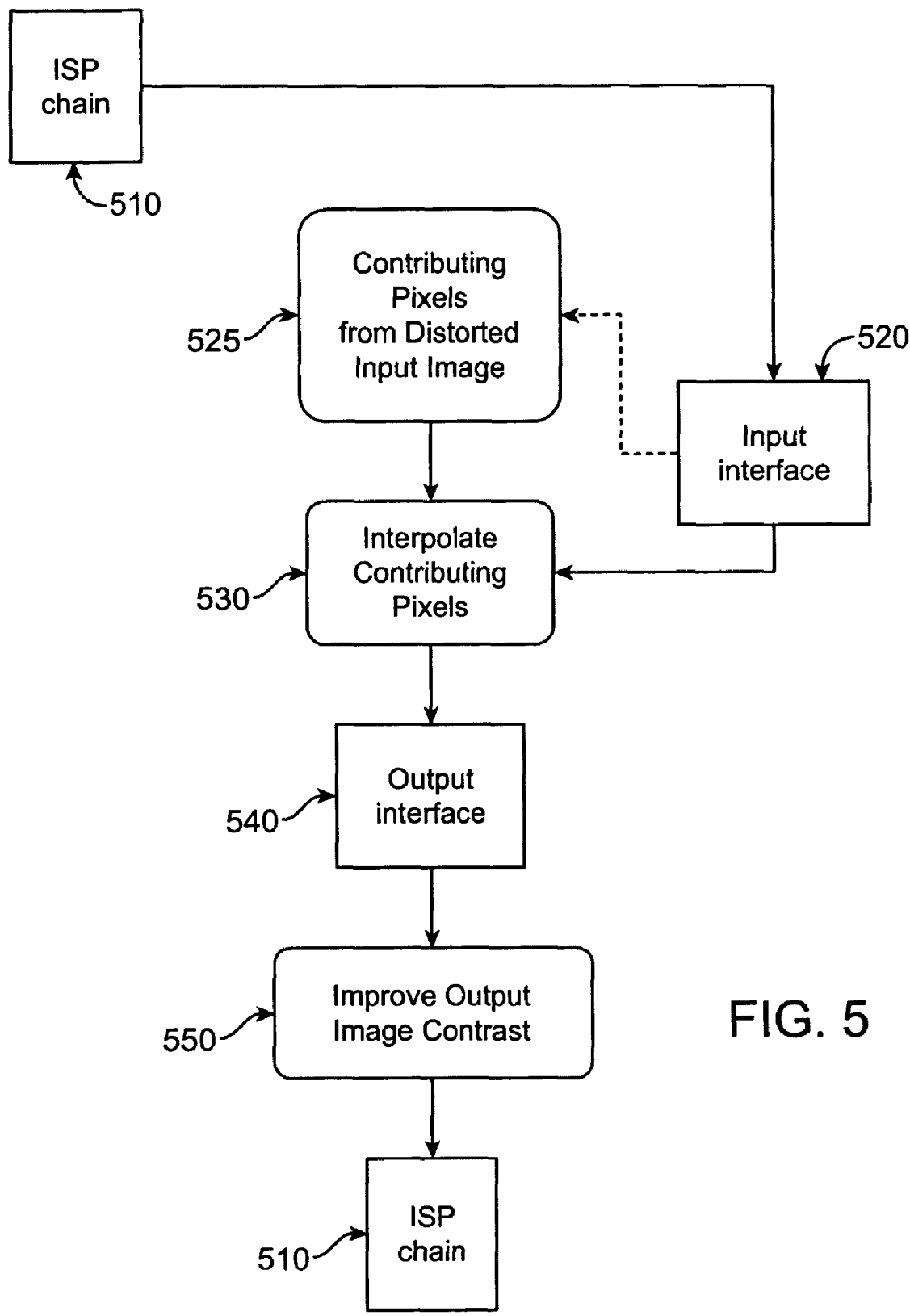
FIG. 5 illustrates a flowchart of an operation of the image processor of FIG. 4A in accordance with an embodiment.

FIG. 5 illustrates a flowchart of an operation that may be performed by the processor 485. The processor 485 may include an image signal processing (ISP) chain 510 that receives an image from the detector 475. This image may be, for example, raw Bayer data or a bitmap image. The image may be supplied to operation 530 via an input interface 520. Operation 530 may also receive contributing pixel indices from operation 525, which determines, for every pixel index in an undistorted output image, close neighbors from the distorted input image. Then, knowing the distortion function of the lens system 410, and since the distortion is fixed, each pixel in the distorted image has a known and fixed magnification factor, thus operation 530 may correct the distortion. Correcting the distortion may be done using known transformations that calculate, according to the preconfigured desired zoom magnification, for every pixel in the desired undistorted image, which pixels from the distorted image contribute to it (as there might not be a pixel-to-pixel matching between the distorted and undistorted image, interpolation between several neighboring distorted pixels may be used to determine the value of the corresponding undistorted pixel). Thus, both 1× magnification, in which the center of the image simply becomes more compressed, and higher magnification factors, where a desired section is cropped from the image center and

TABLE 1

| # | Note | Radius (mm) | Thick (mm) | Medium | Semi-Diameter | Conic | Parameter X2 | Parameter X4 | Parameter X6 | Parameter X8 | Parameter X10 |
|---|------|-------------|------------|--------|---------------|-------|--------------|--------------|--------------|--------------|---------------|
| 0 | OBJ | Infinite | Infinite | Air | 653.2 | 0.000 | 0.000 | 0.000 | 0.000 | 0.000 | 0.000 |
| 1 |     | Infinite | 0.30 | Air | 4.0 | −0.932 | 0.000 | 0.000 | 0.000 | 0.000 | 0.000 |
| 2 | L1 | 2.900 | 1.68 | Plastic | 3.0 | −100.00 | 0.000 | 0.017 | −0.001 | 0.000 | 0.000 |
| 3 |     | 1000 | 0.17 | Plastic | 2.5 | −100.00 | 0.000 | 0.022 | −0.001 | 0.000 | 0.000 |
| 4 | L2 | 112.00 | 1.47 | Plastic | 2.4 | 0.455 | 0.000 | −0.027 | −0.001 | 0.000 | 0.000 |
| 5 |     | 2.700 | 1.68 | Plastic | 1.6 | 0.000 | 0.000 | 0.000 | 0.000 | 0.000 | 0.000 |
| 6 | APS | Infinite | 0.05 | Air | 0.4 | 12.800 | 0.000 | −0.067 | −0.049 | 0.000 | 0.000 |
| 7 | L3 | 3.266 | 0.80 | Plastic | 0.6 | 8.000 | 0.000 | 0.066 | 0.044 | 0.000 | 0.000 |
| 8 |     | −3.045 | 0.63 | Plastic | 0.9 | 2.979 | 0.000 | 0.000 | 0.075 | 0.000 | 0.000 |
| 9 | L4 | −2.504 | 1.51 | Plastic | 1.1 | 22.188 | 0.000 | −0.312 | 0.175 | −0.055 | 0.010 |
| 10 |    | −7.552 | 0.39 | Plastic | 1.6 | 0.000 | 0.000 | 0.000 | 0.000 | 0.000 | 0.000 |
| 11 | IRF | Infinite | 0.30 | N-BK7 | 1.8 | 0.000 | 0.000 | 0.000 | 0.000 | 0.000 | 0.000 |
| 12 |    | Infinite | 0.23 | Air | 1.9 | 0.000 | 0.000 | 0.000 | 0.000 | 0.000 | 0.000 |
| 13 | IMG | Infinite | 0.00 |     | 1.8 | 0.000 | 0.000 | 0.000 | 0.000 | 0.000 | 0.000 |

Here, surface 0 corresponds to the object, L1 corresponds to the first lens 420, L2 corresponds to the second lens 430, APS corresponds to the aperture stop 440, L3 corresponds to the third lens 450, L4 corresponds to the fourth lens 460, IRF corresponds to the IR filter 460 and IMG corresponds to the detector 475. Of course, other configurations realizing sufficient distortion may be used.

Plastic used to create the lenses may be any appropriate plastic, e.g., polycarbonates, such as E48R produced by Zeon Chemical Company, acrylic, PMMA, etc. While all of the lens materials in Table 1 are indicated as plastic, other suitable materials, e.g., glasses, may be used. Additionally, each lens may be made of different materials in accordance with a desired performance thereof. The lenses may be made in accordance with any appropriate method for the selected material, e.g., injection molding, glass molding, replication, wafer level manufacturing, etc. Further, the IR filter 470 may be made of suitable IR filtering materials other than N-BK7.

corrected without compression (or with less compression, according to the desired magnification), may both be realized.

For example, when zoom is set to ×1, operation 530 may be adapted to compute an undistorted picture, with fixed L[MP] resolution, of the projected object data received from the detector 475. The detector 475 may generate data corresponding to the distorted projection of the object to be captured. For this purpose, the distortion generated by the projection system may be known, estimated or measured. When the zoom is higher, operation 530 may adapt the image and crop the desired center of the image, thus receiving the desired zoom with same L[MP] resolution.

Operation 530 may use any suitable interpolation method, e.g., bilinear, spline, edge-sense, bicubic spline, etc., and may output the resultant pixel values to an output interface 540. If needed in accordance with a desired end use, image contrast of the output image may be improved in operation 550. Then, the output image may be returned to the ISP chain 510, where further processing may be performed on the image, e.g., denoising or compression, such as JPEG compression or GIF compression.

The dashed connector between the input interface 520 and operation 525 may be provided if the image capturing device is to operate in more than one image capture mode, e.g., a normal mode and a zoom mode. If so, different distortion corrections may be needed for each mode, so the input interface 520 might provide the image capture mode information to operation 525.

FIG. 6 illustrates an exploded view of a digital camera 600 in which an optical zoom system in accordance with embodiments may be employed. As seen therein, the digital camera 600 may include a lens system 610 to be secured to a lens holder 620, which, in turn, may be secured to a sensor 630. Finally, the entire assembly may be secured to electronics 640.

FIG. 7A illustrates a perspective view of a computer 680 having the digital camera 600 integrated therein. FIG. 7B illustrates a front and side view of a mobile telephone 690 having the digital camera 600 integrated therein. Of course, the digital camera 600 may be integrated at other locations than those shown.

Thus, in accordance with embodiments, an optical zoom may be realized using a fixed-focus lens combined with post processing for distortion correction. A number of pixels used in the detector may be increased beyond a nominal resolution desired to support zoom capability.

As used herein, the term "and/or" includes any and all combinations of one or more of the associated listed items. Further, although terms such as "first," "second," "third," etc., may be used herein to describe various elements, components, regions, layers and/or sections, these elements, components, regions, layers and/or sections should not be limited by these terms. These terms are only used to distinguish one element, component, region, layer and/or section from another. Thus, a first element, component, region, layer and/or section could be termed a second element, component, region, layer and/or section without departing from the teachings of the embodiments described herein.

Spatially relative terms, such as "beneath," "below," "lower," "above," "upper," etc., may be used herein for ease of description to describe the relationship of one element or feature to another element(s) or feature(s), as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

As used herein, the singular forms "a," "an" and "the" are intended to include the plural forms as well, unless the context clearly indicates otherwise. It will be further understood that the terms "comprises," "comprising," "includes," and "including" specify the presence of stated features, integers, steps, operations, elements, components, etc., but do not preclude the presence or addition thereto of one or more other features, integers, steps, operations, elements, components, groups, etc.

Embodiments of the present invention have been disclosed herein and, although specific terms are employed, they are used and are to be interpreted in a generic and descriptive sense only and not for purpose of limitation. While embodiments of the present invention have been described relative to a hardware implementation, the processing of present invention may be implemented in software, e.g., by an article of manufacture having a machine-accessible medium including data that, when accessed by a machine, cause the machine to undistort the data. Further, while the above discussion has assumed the pixels have an equal pitch across the detector, some of all of the compression may be realized by altering the pitch across the detector. Accordingly, it will be understood by those of ordinary skill in the art that various changes in form and details may be made without departing from the spirit and scope of the present invention as set forth in the following claims.

What is claimed is:

1. An image capturing device, comprising:
a detector including a plurality of sensing pixels; and
an optical system adapted to project a distorted image of an object within a field of view onto the sensing pixels, wherein the optical system expands the image in a center of the field of view and compresses the image in a periphery of the field of view, wherein a first number of sensing pixels required to realize a maximal zoom magnification $\hat{Z}$ at a minimum resolution of the image capturing device is less than a square of the maximal zoom magnification times a second number of sensing pixels required for the minimum resolution.

2. The image capturing device as claimed in claim 1, wherein the first number of sensing pixels less than or equal to the second number of sensing pixels times $2\ln(\hat{Z})+1$, where $\hat{Z}$ is the maximal zoom magnification.

3. The image capturing device as claimed in claim 1, wherein the first number of sensing pixels is equal to about 1.75 times the second number of sensing pixels.

4. The image capturing device as claimed in claim 1, wherein the optical system is adapted such that a point spread function in the periphery of the field of view has a full width at half maximum substantially the size of a sensing pixel.

5. The image capturing device as claimed in claim 1, wherein the optical system is adapted such that an optical magnification at the center of the field of view is more than twice an optical magnification at the periphery of the field of view.

6. The image capturing device as claimed in claim 1, wherein the optical system is adapted to provide the distorted image that is separable in orthogonal directions.

7. The image capturing device as claimed in claim 1, wherein the optical system is adapted to provide the distorted image that is radially symmetric.

8. The image capturing device as claimed in claim 1, further comprising a processor adapted to manipulate electronic information output from the detector.

9. The image capturing device as claimed in claim 1, wherein the first number of sensing pixels have equal pitch across the detector.

10. The image capturing device as claimed in claim 1, wherein the optical system includes a plurality of lenses.

11. The image capturing device as claimed in claim 10, wherein each of the plurality of lenses are plastic.

12. The image capturing device as claimed in claim 10, wherein each of the plurality of lenses are fixed focus lenses.

13. A mobile phone including an image capturing device according to claim 1.

14. A portable computer including an image capturing device according to claim 1.

15. A method of providing zoom to a fixed focus lens system, the method comprising:

receiving an expanded image in a center of a field of view;
receiving a compressed the image in a periphery of the field of view; and
processing a first number of sensing pixels required to realize a maximal zoom magnification at a minimum resolution, wherein the first number of sensing pixels is less than a square of the maximal zoom magnification times a second number of sensing pixels required for the minimum resolution.

16. The method as claimed in claim 15, wherein the first number of sensing pixels less than or equal to the second number of sensing pixels times $2\ln(\hat{Z})+1$, where $\hat{Z}$ is the maximal zoom magnification.

17. The method as claimed in claim 15, wherein the first number of sensing pixels is equal to about 1.75 times the second number of sensing pixels.

18. A method of creating an image capturing device, the method comprising:
forming an optical system adapted to project a distorted image of an object within a field, wherein the optical system expands the image in a center of the field of view and compresses the image in a periphery of the field of view;
providing a detector proximate to the optical system, the detector having a first resolution higher than a second resolution of an image to be output; and
processing signals output from the detector to provide the image of the first resolution over a continuous zoom range.

19. The method as claimed in claim 18, wherein the continuous zoom range is from ×1 to ×3.

20. The method as claimed in claim 18, the first resolution corresponds to a first number of sensing pixels, the second resolution corresponds to a second number of sensing pixels, $\hat{Z}$ is a maximal zoom magnification and the first number of sensing pixels in the detector is less than $\hat{Z}^2$ times the second number of sensing pixels.

* * * * *